Feb. 26, 1963
A. K. CHITAYAT
3,079,503
NEGATIVE TO POSITIVE MICROSCOPE
Filed March 29, 1962
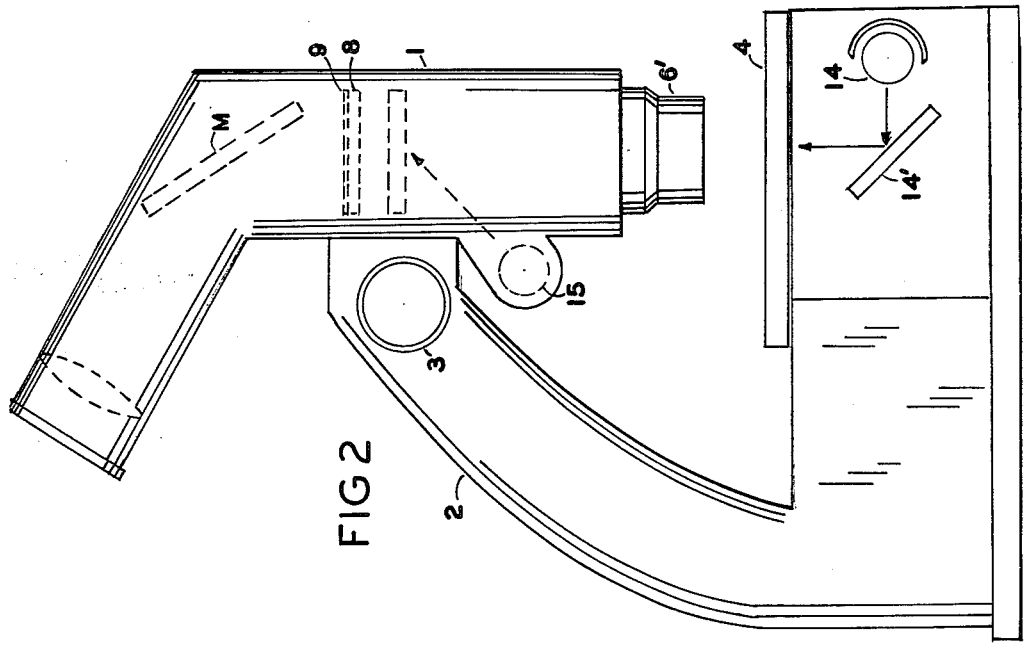
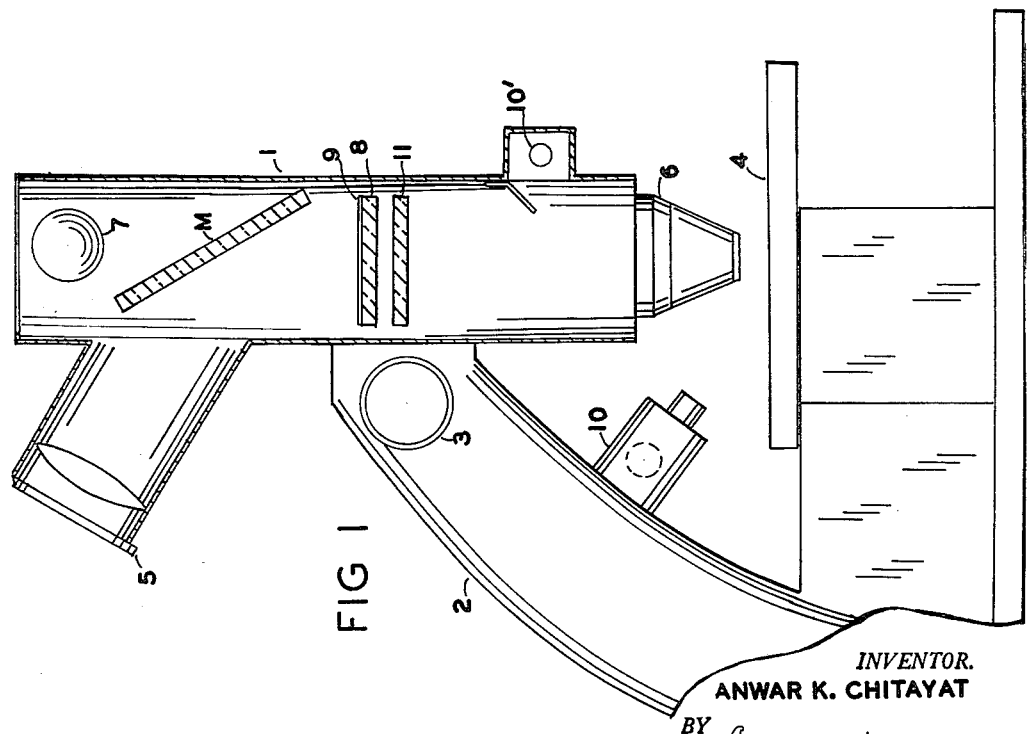
INVENTOR.
ANWAR K. CHITAYAT
BY *James P. Malone*

United States Patent Office 3,079,503
Patented Feb. 26, 1963

3,079,503
NEGATIVE TO POSITIVE MICROSCOPE
Anwar K. Chikayat, Plainview, N.Y., assignor to
OPTOmechanisms, Inc., Plainview, N.Y.
Filed Mar. 29, 1962, Ser. No. 183,472
1 Claim. (Cl. 250—71)

This invention relates to microscopes and more particularly to means for reversing the image from negative to positive.

In several medical applictions, chemical analysis, and photographic interpretation a need exists for a microscope that reverses the image negative to positive. In other words, the opaque portions are to appear luminous and the luminous portions are to appear black.

The invention generally comprises a microscope body having an eye piece and a specimen mounting means, means for illuminating the specimen with infrared radiation, a luminous screen in the microscope body and a source of ultraviolet radiation adapted to illuminate the screen. In the operation of the system, the ultra-violet light makes the screen luminous and the infrared light reflected from the specimen quenches portions of the luminous screen so that a reverse image is presented. In other words, a photographic negative may be examined and a positive image obtained.

Accordingly, a principal object of the invention is to provide new and improved microscope means.

Another object of the invention is to provide new and improved microscope means having means to change the image from negative to positive.

Another object of the invention is to provide new and improved microscope means having a translucent phosphor screen, a sourc of ultraviolet light adapted to illuminate said screen, a source of infrared light adapted to illuminate the specimen so that the reflected infrared light is cast upon the luminous screen and quenches portions of the luminous screen.

These and other objects of the invention will be apparent from the following specification and drawings, of which FIG. 1 is a side view partially in section of an embodiment of the invention.

FIG. 2 is a side view of a modification of the invention.

Referring to FIG. 1 the invention comprises a hollow vertical body 1 which is mounted on a mounting arm 2 and which is adapted to be moved up and down by means of the knob 3 in conventional manner.

A specimen mounting plate 4 is provided underneath the lower end of the vertical body 1. The vertical body 1 has an eye piece 5 at its upper end and an objective lens 6 at its lower end. A source of ultraviolet light 7 is mounted near the top of the body 1 and this light is transmitted through the half reflecting mirror M onto a translucent screen 8 which has a phosphor coating 9 of the type which is made luminous by ultraviolet light. The phosphor may be zinc sulphide activated by copper or iron. A source of infrared radiation 10 is provided for illuminating a specimen on the mounting plate 4. If desired a second source of infrared radiation 10' may also be used. An infrared filter 11 is mounted below the phosphorescent screen 8. This filter is preferably used only when the infrared lamp transmits visible light in order to prevent the visible light from impinging on the screen 8.

In operation, the phosphorescent screen is illuminated and made luminous by the ultraviolet light. The infrared light reflected from the specimen quenches a portion of the luminous screen so that the image of the specimen on the screen is changed from negative to positive. In other words, the dark portions of the specimen appear luminous and the luminous portions of the specimen appear black. For instance, if a photographic negative were viewed in this manner than the viewer would see a positive reproduction of the negative film.

FIG. 2 shows a modification of the invention which is similar to FIG. 1 except the infrared source 14 is placed underneath the specimen mounting plate 4. Therefore, the infrared light is reflected by the mirror 14' and passes through the plate 4 and the specimen into the objective lens 6'. In this modification the ultraviolet source 15 is mounted underneath the screen 8. The operation of the system is the same as previously described except that it would be used with transparent specimens. The magnification optics and mechanical mounting may be conventional.

The infrared light may be pulsed for instance with a chopper disc or other pulsing means to avoid overheating the film or other specimen. The storage ability of the screen then integrates the infrared.

Many modifications may be made by those who desire to practice the invention without departing from the scope thereof which is defined by the following claim.

I claim:

A negative to positive microscope comprising:
a vertical cylindrical hollow tube having an eyepiece connected at an angle to said tube adjacent its upper end and having an objective lens at its lower end,
means for mounting a specimen under said objective lens,
a source of infrared radiation mounted in said tube said radiation being adapted to be reflected by said specimen onto said objective lens,
a translucent phosphor screen mounted in said tube perpendicular to the axis of said tube below said eyepiece,
a source of ultraviolet light mounted in the upper end of said tube, a half reflecting mirror mounted in said tube adjacent said eyepiece at an angle with respect to said tube chosen to transmit rays which are parallel to the axis of said tube into said eyepiece, said ultraviolet light being thereby adapted to illuminate said screen whereby said ultraviolet light makes said screen luminous and said infrared quenches portions of said luminous screen to thereby provide a reverse image of said specimen on said screen and on said eyepiece.

References Cited in the file of this patent
UNITED STATES PATENTS

| 745,584   | Ednez    | Dec. 1, 1903   |
| 2,522,493 | Bailly   | Sept. 19, 1950 |
| 2,549,860 | Swanson  | Apr. 24, 1951  |
| 2,642,538 | Urbach   | June 16, 1953  |
| 2,996,617 | Huckscher| Aug. 15, 1961  |
| 3,028,492 | Goerz    | Apr. 3, 1962   |

FOREIGN PATENTS

| 509,308 | Great Britain | July 11, 1939 |